United States Patent [19]

Elkateb et al.

[11] 4,390,835
[45] Jun. 28, 1983

[54] FAULT IDENTIFICATION IN ELECTRIC POWER TRANSMISSION SYSTEMS

[75] Inventors: Makeen M. Elkateb; William J. Cheetham, both of Stafford, England

[73] Assignee: The General Electric Company Limited, London, England

[21] Appl. No.: 190,268

[22] Filed: Sep. 24, 1980

[30] Foreign Application Priority Data

Sep. 27, 1979 [GB] United Kingdom ............... 7933571

[51] Int. Cl.³ ............................................. G01R 31/02
[52] U.S. Cl. ........................................ 324/51; 361/79
[58] Field of Search ..................... 324/51; 361/47, 79, 361/80

[56] References Cited

U.S. PATENT DOCUMENTS

| | | | |
|---|---|---|---|
| 4,063,300 | 12/1977 | Paddison et al. | 361/79 X |
| 4,261,038 | 4/1981 | Johns et al. | 361/79 X |
| 4,272,816 | 6/1981 | Matsumoto et al. | 361/79 X |
| 4,281,386 | 7/1981 | Kondow et al. | 361/79 X |

FOREIGN PATENT DOCUMENTS 1199200 7/1970 United Kingdom ............... 324/51

OTHER PUBLICATIONS

Chamia et al., Ultra High Speed Relay for EHV/UHV Transmission Lines—Development, Design and Application, IEEE Transactions on Power Apparatus & Systems, vol. PAS—97, No. 6, Nov./Dec., 1978, pp. 2104–2112.

Primary Examiner—Stanley T. Krawczewicz
Attorney, Agent, or Firm—Kirschstein, Kirschstein, Ottinger & Cobrin

[57] ABSTRACT

A method of identifying faults in a polyphase alternating current electric power transmission system wherein determination of the type of fault occurring is effected by monitoring, using analogue techniques, the instantaneous values of quantities derived from superimposed currents and/or voltages arising in the system on occurrence of a fault. Apparatus for carrying out the method is also disclosed.

15 Claims, 8 Drawing Figures

FAULT IDENTIFICATION IN ELECTRIC POWER TRANSMISSION SYSTEMS

This invention relates to methods and apparatus for protecting polyphase alternating current electric power transmission systems against faults.

Such methods and apparatus are required to identify the type of fault that has occurred so that appropriate action to protect the transmission system can be taken.

It will be appreciated that identifying the type of fault essentially involves identifying whether the fault is between phases or between one or more phases and ground and may or may not also involve determining the particular phase or phases involved in the fault.

It is an object of the present invention to provide a method and apparatus for identifying faults in polyphase alternating current electric power transmission systems which is capable of identifying a fault very rapidly.

According to the present invention in a method of identifying faults in a polyphase alternating current electric power transmission system determination of the type of fault occurring is effected by monitoring, using analogue techniques, the instantaneous values of quantities derived from superimposed currents and/or voltages arising in the system on occurrence of a fault.

By a superimposed quantity is meant the difference between the post-fault and pre-fault values of that quantity.

Preferably said quantities are derived from the system phase superimposed currents and/or the system phase or phase-to-phase superimposed voltages and by addition or subtraction of said currents or said voltages.

The particular quantities monitored to identify particular types of faults are further explained below.

The invention also provides an apparatus for identifying faults in a polyphase alternating current electric power transmission system by a method according to the invention comprising: transducer means for producing analogue signals respectively representative of system currents and/or voltages; signal deriving means utilising said analogue signals to derive further analogue signals representing the corresponding superimposed currents and/or voltages arising in the system on occurrence of a fault in the system; and analogue comparator means producing an indication as to how many phases the fault involves and whether ground in involved in the fault by comparing quantities derived by addition or subtraction of said further signals with predetermined quantities.

Protection engineers have had in mind for some years the possibility of monitoring superimposed voltages and currents. One example of a protection system which uses this approach is described in U.S. Pat. No. 4,063,300 (issued Dec. 13, 1977 to E. Paddison, L. Perez-Cavero and C. G. Wilson) in which the standard amplitude and phase comparisons for fault detection are effectively performed with superimposed quantities instead of system phase currents and/or phase or line-to-line voltages. Another example is described in an article by M. Chamia and S. Liberman appearing in IEEE Transactions on Power Apparatus and Systems, Vol. PAS-97 No. 6 November/December 1978, pages 2104 to 2112 wherein superimposed quantities are used to determine the direction of a fault.

The present invention proceeds a further step in that the type of fault, not merely its direction is determined, and the determination is effected by monitoring instantaneous values of superimposed quantities, rather than amplitudes and relative phases which is necessarily slower.

The method and apparatus provided by the invention will now be further explained, and one example of a method and apparatus according to the invention will be described with reference to the accompanying drawings in which.

The method and apparatus utilise superimposed quantities for fault detection. Superimposed quantities are those which arise in the system as a result of a fault, as will now be further explained.

Figure 1:
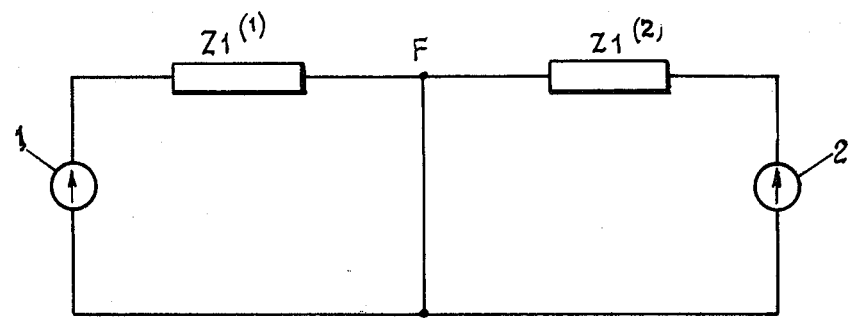
FIG. 1 is an equivalent circuit diagram of a single phase power transmission system under ground fault conditions.

FIG. 1 shows a single-phase transmission system in a ground fault condition, 1 and 2 representing respectively emf sources at opposite ends of the system and $Z1^{(1)}$ and $Z1^{(2)}$ representing respectively the impedances on either side of the fault F.

Figure 2A:
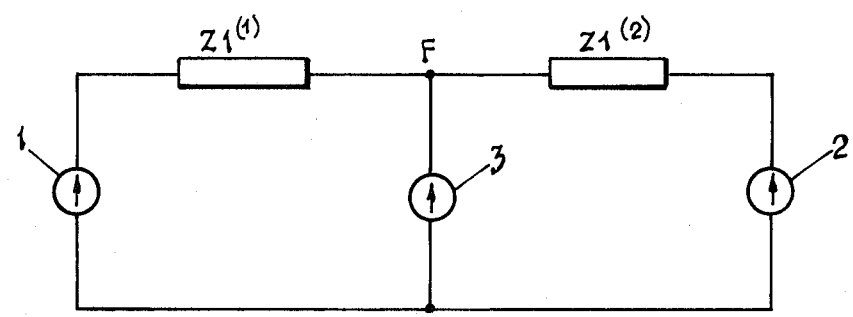
FIGS. 2a and 2b are steady state and superimposed quantity diagrams of the system of FIG. 1.
Figure 2B:
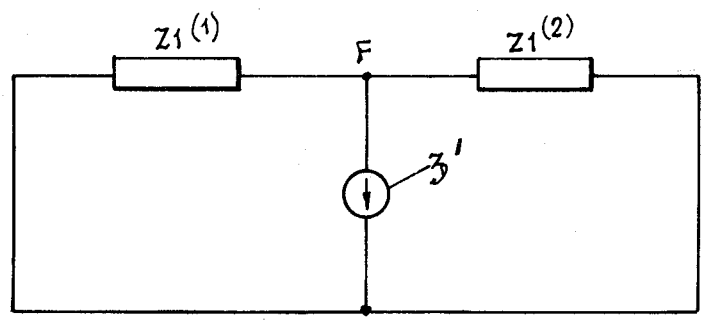

By application of the superposition principle the diagram of FIG. 1 can be replaced by the two diagrams as shown in FIGS. 2a and 2b, where the source 3' in FIG. 2b provides an emf equal but of opposite phase to the prefault voltage at fault point F represented by the ficticious source 3 in FIG. 2a. The currents and voltages in the system under unfaulted or steady conditions can be determined from FIG. 2a while the currents and voltages superimposed on the steady state quantities on occurrence of the fault can be determined from FIG. 2b.

The way in which superimposed quantities may be used to identify the type of fault that has occurred in a 3-phase transmission system will now be explained.

Figure 3A:
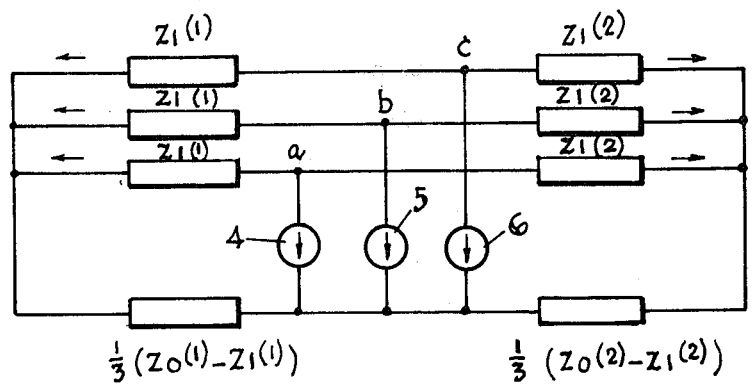
FIGS. 3a to 3d are superimposed quantity diagrams of a 3-phase power transmission system under various fault conditions.

FIG. 3a is a superimposed quantity diagram for a three phase system having perfectly transposed lines and symmetrical sources in which a solid three phase to ground fault has occurred. The emfs V'af, V'bf and V'cf of the fault point sources 4, 5 and 6 are as follows:

$$V'af = -Vaf$$

$$V'bf = -Vbf$$

$$V'cf = -Vcf$$

where Vaf, Vbf and Vcf are the pre-fault phase voltages at the fault point.

Also the following relationships exist:

$$V'af + V'bf + V'cf = O$$

$$I'a + I'b + I'c = In = O$$

where I'a, I'b, I'c are the phase superimposed currents, and In is the neutral current.

It may be shown that the following conditions exist at any point on the system:

$$Ia' + Ib' + Ic' = O$$

$$V'a + V'b + V'c = O$$

$$V'ab + V'bc + V'ca = 0$$

where V'a, I'a etc are superimposed quantities measured at that point.

It will be appreciated that a three phase falut not involving ground gives rise to the same conditions, but such conditions will not exist for any other type of fault. Thus the existence of any of the above three conditions uniquely identifies the existence of a three phase fault on the system.

Figure 3B:
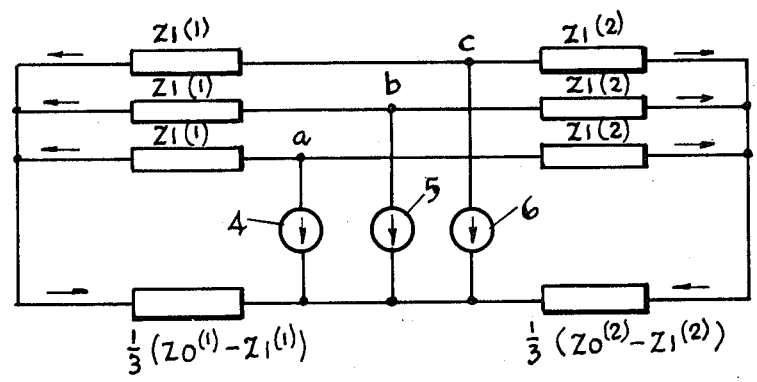

FIG. 3b is a superimposed quantity diagram for the same three phase system in which an a-phase to ground fault exists. The emf s of fault point sources 4, 5 and 6 are then as follows:

$$V'af = -Vaf$$

$$V'bf = V'cf$$

and the following relationships exist $$I'b = I'c$$

It may be shown that the following unique conditions exist at any point on the system:

$$I'b - I'c = 0 = (I'a - I'b) + (I'c - I'a)$$

$$V'b - V'c = 0 = (V'a - V'b) + (V'c - V'a)$$

It will be appreciated that similar unique conditions exist for b-phase and c-phase to ground faults.

Figure 3C:
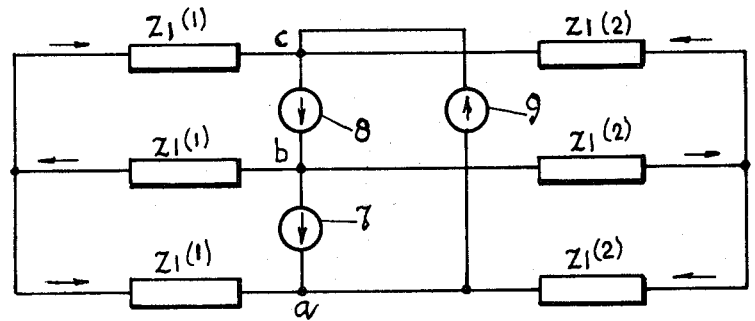

FIG. 3c is a superimposed quantity diagram for the same three phase system in which an a-phase to b-phase fault exists. The e.m.fs V'abf, V'bcf and V'caf of fault point sources 7, 8 and 9 are then as follows:

$$V'abf = -Vabf$$

$$V'bcf = V'caf$$

where Vabf is the pre-fault fault point voltage between phases a and b.

Also the following relationships exist $$I'a + I'b = 0 \text{ and } I'c = In = 0$$

It may be shown that this fault can be identified by the occurrence of any of the following conditions at any point on the system.

$$I'a + I'b = 0 = (I'b + I'c) + (I'c + I'a)$$

$$V'bc - V'ca = 0 = (Vab - V'bc) + (V'ca - V'ab)$$

Other two phase faults can be similarly identified.

Figure 3D:
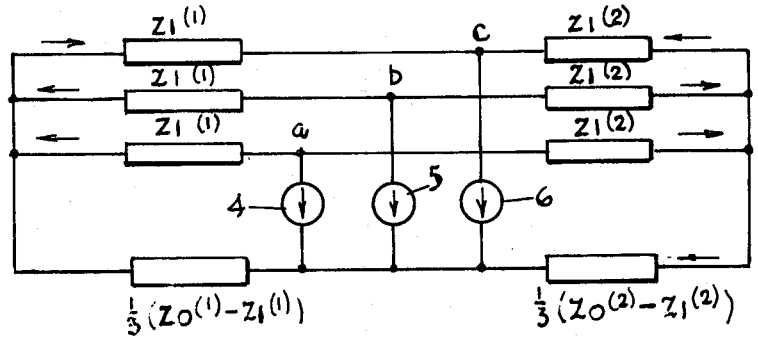

Finally, FIG. 3d is a superimposed quantity diagram for the same system in which an a-phase to b-phase to ground fault exists. The e.m.fs of fault point sources 4, 5 and 6 are then as follows:

$$V'af = -Vaf$$

$$V'bf = -Vbf$$

$$V'c = f\left(\frac{Zo^{(1)}}{Zo^{(2)}}, \frac{Z1^{(1)}}{Z1^{(2)}}\right)$$

where $Zo^{(1)}$ and $Zo^{(2)}$ are the zero sequence impedances on either side of the fault point.

Also the following relationships exist:

$$I'a + I'b = I'c + In$$

$$I'c = f(V'c)$$

It may be shown that the following unique condition exists at any point in the system $$I'a + I'b - In = I'c$$

Other two phase to ground faults can be similarly identified.

It will be appreciated that when the assumptions of perfectly transposed lines and/or symmetrical sources and/or solid faults are not permissible the conditions which will identify the type of fault require further consideration.

In multi-earthed transmission systems with double end feeds this problem can be largely overcome in identifying single phase to ground, phase to phase and three phase faults by detecting when the relevant quantities exceed a threshold value rather than zero.

In the case of two and three phase to ground faults, however, the conditions which exist depend largely on fault location and the source to line impedance of the opposite source. Thus, while the condition Ia' + I'b − In = I'c is met for a close up a and b-phases to ground fault on a comparatively long or short line with high source to line impedance ratio of the opposite source, for the same system a two phase to ground fault at the reach point may be seen by the fault identifying apparatus as a three phase to ground fault especially for the case of arcing or comparatively high resistance faults. Furthermore, with unequal fault impedances discrimination between two and three phase to ground faults is often impossible.

One manner in which this difficulty may be dealt with is described below in relation to FIG. 4.

Further difficulties of this nature arise in single end fed systems.

For example, in such a system where the neutrals on source and load sides are solidly earthed equal superimposed current I'a, I'b and I'c flow on the load side for a single phase to ground fault so that identification using phase current difference is lost on the load side. However the phase current difference condition is still valid on the source side and the phase voltage condition is still valid on both source and load sides.

Furthermore, in such a system with solidly earthed source supplying an isolated neutral star/star transformer whose secondary is at light load condition, current levels on the transformer side are too low for single phase to ground faults to be satisfactorily identified.

In such a system with a source having an isolated neutral supplying a grounded neutral star/delta transformer whose delta side is at light load condition the current relations on the transformer side do not meet the specified conditions.

In such a system with solidly earthed source supplying a delta/star transformer whose star side has a grounded neutral but is at light load condition the current values are too low to permit satisfactory fault identification.

It will thus be seen that in single end fed systems current relations are in general not satisfactory for identification of faults.

It may thus be concluded that in general voltage relation conditions are more satisfactory for fault identification. However, for systems with very high short circuit level conditions the source impedances become so small that the superimposed voltage becomes negligible. Hence it is more convenient in many cases to polarise the superimposed voltage with superimposed current.

For example, in the case of an a-phase to ground fault the condition used for fault identification could be $$(V'b-V'c)+R(I'b-I'c)=0$$

or alternatively $$(V'a-V'b)+(V'c-V'a)+R[(I'a-I'b)+(I'c-I'a)]=0$$

where R is any suitable ohmic quantity.

Similarly, for an a-phase to b-phase fault the following condition may be used for fault identification $$(V'bc-V'ca)+R(I'a+I'b)=0$$

Figure 4:
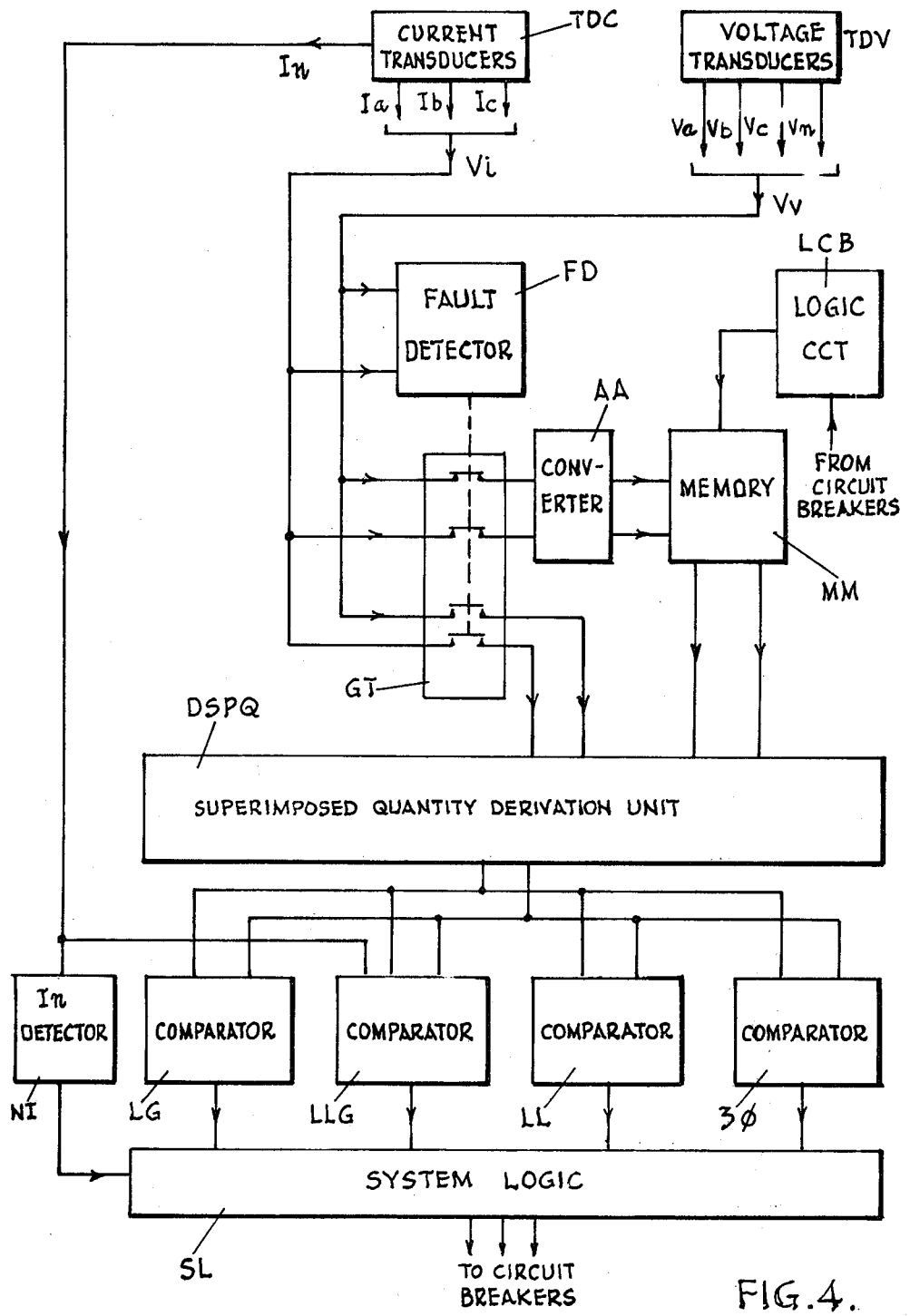
FIG. 4 is a block schematic diagram of one apparatus in accordance with the invention.

FIG. 4 shows in block schematic form one apparatus for use in a protective relay equipment to control circuit breaker operation wherein identification of faults is effected by a method as described above.

The input to the apparatus comprises three signals Vi representative of the system phase currents and four signals Vv representative of the system phase and neutral voltages, these signals being produced in conventional manner by current and voltage transducers TDC and TDV e.g. transformers.

The current and voltage representative signals Vi and Vv are supplied to a fault detector FD which indicates when a fault has occurred in the system e.g. by means of a circuit, such as described in U.S. Pat. No. 3,845,429 (issued to F. M. Gray on the Oct. 29, 1974), which produces an output when a rapid vector change occurs in an input Vi or Vv.

When the detector FD is not indicating a fault the input signals Vi and Vv are fed via a gate GT to an analogue to analogue converter AA which prepares them for storage in a memory MM. The memory continuously stores samples of the values of inputs Vi and Vv relating to at least the preceding cycle of the system, and may suitably comprise a charge coupled device memory arrangement.

A logic circuit LCB determines when the circuit breaker (not shown) controlled by the apparatus is opened, the memory MM being cleared when the circuit breaker opens to be ready for further operation if and when the circuit breaker recloses.

On detection of a fault by detector FD the gate GT is operated to supply input signals Vi and Vv to a unit DSPQ instead of to the memory MM via converter AA.

The unit DSPQ differences the signals Vv and Vi under fault conditions and the pre-fault values of Vv and Vi stored in memory MM to derive the required superimposed quantities I'a, V'a etc required for fault detection.

Existence of the various different conditions for different types of faults are detected by fault identification analogue comparator units LG, LLG, LL and 3∅ to which the appropriate superimposed quantities are supplied from unit DSPQ.

The unit LG identifies phase to ground faults and is thus arranged to produce an output when it detects any of the following conditions:

$$I'a-I'b \leq \theta i$$

$$V'a-V'b \leq \theta v$$

$$I'b-I'c \leq \theta i$$

$$V'b-V'c \leq \theta v$$

$$I'c-I'a \leq \theta i$$

$$V'c-V'a \leq \theta v$$

where $\theta i$ and $\theta v$ have low values such that if not exceeded the relevant compared quantity may be assumed to be zero.

The unit LL identifies phase to phase faults by producing an output when it detects any of the following conditions:

$$I'a+I'b \leq \theta i$$

$$V'bc-V'ca \leq \theta v$$

$$I'b+I'c \leq \theta i$$

$$V'ca-V'ab \leq \theta v$$

$$I'c+I'a \leq \theta i$$

$$V'ab-V'bc \leq \theta v$$

The unit 3∅ identifies three phase faults, solid three phase to ground faults, and three phase to ground faults with equal phase to ground fault resistances and/or equal phase to phase fault resistances by producing an output when it detects either of the following conditions:

$$I'a+I'b+I'c \leq \theta i$$

$$V'a+V'b+V'c \leq \theta v$$

The unit LLG identifies phase to phase to ground faults. When the apparatus is employed in a switched distance protective relay scheme the unit LLG is suitably arranged to produce an output when it detects any of the following conditions:

$$I'a+I'b-In \leq \lambda i$$

$$I'b+I'c-In \leq \lambda i$$

$$I'c+I'a-In \leq \lambda i$$

where $\lambda i$ is a precalculated value for the healthy phase superimposed current during a phase to phase to ground fault in the protected system.

For more accurate detection the angular difference between I'a+I'b etc and In may be used. However this technique assumes sinusoidal waveforms and hence the unit LLG may require filters to eliminate high frequency and decaying components.

A high resistance phase to phase to ground fault will generally produce conditions similar to a three phases to ground fault and be detected by unit 3∅.

In other than switched distance schemes, e.g. autoreclose schemes where faults other than single phase faults trip and reclose circuit breakers in all three phases, then the unit LLG may be dispensed with and any fault detected by FD which is not identified by units LG, LL or 3∅ assumed to be a two phase to ground fault.

The output of the fault identification units are fed to a system logic unit SL in which a final decision on determination of fault and operation of circuit breakers is taken. The functions performed by the unit SL depend on the particular protective relay scheme in which the apparatus is used and the actual protected system. Thus if LLG is dispensed with, as described above, the unit SL is arranged to assume a two phase to ground fault if the detector FD detects a fault but none of the fault identification units LG, LL and 3∅ produces an output. Unit SL may also be arranged to assume a three phase fault if two or more fault identification units simultaneously produce outputs.

It will be appreciated that if the system logic unit SL needs to know the particular phase or phases involved in a fault detected by a fault identification unit LG, LL or LLG, such unit may easily be arranged to indicate this to the logic unit SL by indicating which of the various conditions it monitors has been detected.

To assist the unit SL to take decisions a detector unit NI may be provided to indicate when the neutral current In exceeds a predetermined value. This is of particular value for identification of unusual fault conditions such as simultaneous faults or cross country faults. The unit SL may also be arranged to take decisions when slowly evolving faults arise.

It will be appreciated that in a method or apparatus according to the invention identification is inherently high speed since identification commences as soon as the system disturbance produced by a fault has propagated along the system from the fault point to the monitoring, i.e. protective relaying, point. Furthermore the identification of faults from such disturbances i.e. superimposed quantities is performed directly without the quantities going through delay introducing components such as filters, transactors or analogue to digital converters.

We claim:

1. A method of identifying faults in a polyphase alternating current electric power transmission system wherein determination of the type of fault occurring is effected by monitoring, using analogue techniques, the instantaneous values of quantities which are combinations of at least two of the group comprising the superimposed currents and the superimposed voltages arising in the system on occurrence of a fault.

2. A method according to claim 1 wherein said currents and voltages are at least some of the system phase superimposed currents, the system phase superimposed voltages and the system phase-to-phase superimposed voltages.

3. An apparatus for identifying faults in a polyphase alternating current electric power transmission system by a method according to claim 1 comprising: transducer means for producing analogue signals respectively representative of system currents and voltages; signal deriving means utilizing said analogue signals to derive further analogue signals representing the corresponding superimposed currents and voltages arising in the system on occurrence of a fault in the system; and analogue comparator means for producing an indication as to how many phases the fault involves and whether ground is involved in the fault by comparing the instantaneous values of quantities which are combinations of said further signals with predetermined quantities.

4. An apparatus according to claim 3 wherein said comparator means further produces an indication as to which particular phase or phases are involved in the fault.

5. An apparatus according to claim 3 wherein said signal deriving means comprises memory means for storing the signals produced by the transducer means; and means for differencing the signals stored in the memory means immediately prior to the occurrence of a fault with the signals produced by the transducer means immediately following a fault.

6. An apparatus according to claim 3 further including logic means responsive to the output of the comparator means to control the operation of a circuit breaker in the power transmission system.

7. An apparatus according to claim 6 wherein said logic means is also responsive to the instantaneous value of the system neutral current.

8. A method of identifying faults in a three-phase alternating current electric power transmission system wherein determination of the type of fault occurring is effected by monitoring, using analogue techniques, the instantaneous values of at least some of the quantities $I'a-I'b$, $I'b-I'c$, $I'c-I'b$, $I'a+I'b$, $I'b+I'c$, $I'c+I'a$, $V'a-I'b$, $V'b-V'c$, $V'c-V'a$, $V'bc-V'ca$, $V'ca-V'ab$, $V'ab-V'bc$, $I'a+I'b+I'c$, $V'a+V'b+V'c$, $I'a+I'b-In$, $I'b+I'c-In$ and $I'c+I'a-In$ where $I'a$, $I'b$ and $I'c$ are the respective phase superimposed currents arising in the system on occurrence of a fault, $V'a$, $V'b$ and $V'c$ are the respective phase superimposed voltages arising in the system on occurrence of a fault, $V'ab$, $V'bc$ and $V'ca$ are the respective phase to phase superimposed voltages arising in the system on occurrence of a fault and In is the neutral current arising in the system on occurrence of a fault.

9. A method according to claim 8 wherein the presence of a single phase to ground fault is identified by determining whether any of the following conditions exists:

$$I'a-I'b \leq \theta i$$

$$I'b-I'c \leq \theta i$$

$$I'c-I'a \leq \theta i$$

where $\theta i$ is a low reference value such that if not exceeded the relevant compared quantity may be assumed to be zero.

10. A method according to claim 8 wherein the presence of a single phase to ground fault is identified by determining whether any of the following conditions exists:

$$V'a-V'b \leq \theta v$$

$$V'b-V'c \leq \theta v$$

$$V'c-V'a \leq \theta v$$

where $\theta v$ is a low reference value such that if not exceeded the relevant compared quantity may be assumed to be zero.

11. A method according to claim 8 wherein the presence of a phase-to-phase fault is identified by determining whether any of the following conditions exists:

$$I'a + I'b \leq \theta i$$

$$I'b + I'c \leq \theta i$$

$$I'c + I'a \leq \theta i$$

where $\theta i$ is a low reference value such that if not exceeded the relevant compared quantity may be assumed to be zero.

12. A method according to claim 8 wherein the presence of a phase-to-phase fault is identified by determining whether any of the following conditions exists:

$$V'bc - V'ca \leq \theta v$$

$$V'ca - V'ab \leq \theta v$$

$$V'ab - V'bc \leq \theta v$$

where $\theta v$ is a low reference value such that if not exceeded the relevant compared quantity may be assumed to be zero.

13. A method according to claim 8 wherein the presence of a three-phase fault is identified by determining whether either of the following conditions exists:

$$I'a + I'b + I'c \leq \theta i$$

$$V'a + V'b + V'c \leq \theta v$$

where $\theta i$ and $\theta v$ are low reference values such that if not exceeded the relevant compared quantity may be assumed to be zero.

14. A method according to claim 8 wherein the presence of a two phases to ground fault is identified by determining whether any of the following conditions exists:

$$I'a + I'b - In \leq \lambda i$$

$$I'b + I'c - In \leq \lambda i$$

$$I'c + I'a - In \leq \lambda i$$

where $\lambda i$ is a precalculated value for the healthy phase superimposed current during a two phases-to-ground fault.

15. A method according to claim 8 modified in that a monitored voltage quantity is replaced by that quantity polarised with the corresponding current quantity.

* * * * *